United States Patent [19]

Oishi et al.

[11] 3,732,449
[45] May 8, 1973

[54] ROTATIONAL ANGLE DETECTING DEVICE

[75] Inventors: Masaaki Oishi, Tokyo; Yoshinaga Takahashi, Yachiyo; Keiichi Yoshizawa, Matsudo, all of Japan

[73] Assignee: Kabushiki Kaisha Hattori Tokeiten, Tokyo, Japan

[22] Filed: July 8, 1971

[21] Appl. No.: 160,756

[30] Foreign Application Priority Data

July 9, 1970  Japan ................................ 45/59473

[52] U.S. Cl. .................................. 310/259, 310/156
[51] Int. Cl. ............................................ H02k 1/12
[58] Field of Search ..................... 310/259, 156, 181, 310/179, 268, 168, 46, 258, 169, 170

[56] References Cited

UNITED STATES PATENTS

| | | | |
|---|---|---|---|
| 3,328,616 | 6/1967 | Ringland | 310/268 |
| 3,482,131 | 12/1969 | Lytle | 310/156 |
| 3,081,624 | 3/1963 | Mayer | 310/168 |
| 3,243,621 | 3/1966 | Wesolowski | 310/168 |
| 3,297,891 | 1/1967 | Foran | 310/46 |
| 3,239,702 | 3/1966 | Van De Graaff | 310/168 |

*Primary Examiner*—R. Skudy
*Attorney*—Robert E. Burns et al.

[57] ABSTRACT

A rotational angle detecting device comprising a rotor having a rotary disk carrying two L-shaped yokes and associated permanent magnets, disposed symmetrically relative to the axis of rotation thereof. A stator of the device has a stationary coil and a stationary yoke. The rotational yokes and magnets revolve past the stationary coil and stationary yoke. As the individual magnets move past the stationary coil, a closed magnetic path is formed through confronting faces of the movable and stationary yokes. As the magnets move past the stationary coil, the stationary coil cuts the magnetic flux instantaneously to produce a high induced voltage across the coil. The rotor is driven in timed relationship with a rotationally driven or rotary body so that the maximum induced voltage can be used in indicating an angular position of the rotary body with respect to a reference position.

6 Claims, 6 Drawing Figures

ROTATIONAL ANGLE DETECTING DEVICE

BACKGROUND OF THE INVENTION

This invention relates generally to rotational angle detecting devices and, more particularly to devices for detecting the rotational angle of a print drum of a printing device for a calculator.

DESCRIPTION OF PRIOR ART

Known rotational angle detecting devices comprise a stator and a rotor. The stator is provided with a wire wound on a central core and a yoke, L-shaped in cross section, and the rotor is provided with an L-shaped yoke and a permanent magnet secured to the center thereof. The yokes of both the stator and the rotor face each other at some point during relative rotation. The rotor rotates in synchronism with a rotary body, the angle of rotation of which is to be detected. As the magnet revolves past the coil, the coil cuts the magnetic flux and a voltage is induced across the coil, thereby detecting the rotational angle of the rotating body.

In the conventional rotational angle detecting device as above-described, a closed magnetic path is formed through both L-shaped yokes only when the revolving magnet is in registry with the stationary coil. In such a device, however, the magnetic flux is cut gradually with the movement of the magnet, so that the induced voltage is low compared with a case in which the magnetic flux is cut rapidly.

SUMMARY OF THE INVENTION

A principal object of the invention is to provide a rotational angle detecting device, which operates precisely and reliably.

Another object of the invention is to provide a rotational angle detecting device, which provides a high induced voltage across the coil with a small number of coil turns to thereby enable reducing the size of the device.

In accordance with the present invention, an improved rotational angle detecting device is provided, which comprises a rotor having a non-magnetic rotary disk carrying at least one pair of L-shaped yokes and an associated permanent magnet, and a stationary member or stator supporting a coil and a stationary yoke. The coil and at least one part of the stationary yoke, assume a relative position opposed to the permanent magnet; another part or surface of the stationary yoke faces only the rotary yoke. Accordingly, a closed magnetic path, for magnetic flux, through both the stationary and movable yokes is formed before the magnet passes past the coil, and the magnetic flux is cut by the coil instantaneously as the magnet passes by the coil, to induce a high voltage across the coil.

BRIEF DESCRIPTION OF THE DRAWINGS

These objects, other objects, and the characteristic features of the present invention will become evident and will be more readily understood from the following description and claims taken in conjunction with the accompanying drawings, in which:

DESCRIPTION OF THE PREFERRED EMBODIMENTS

Figure 1:
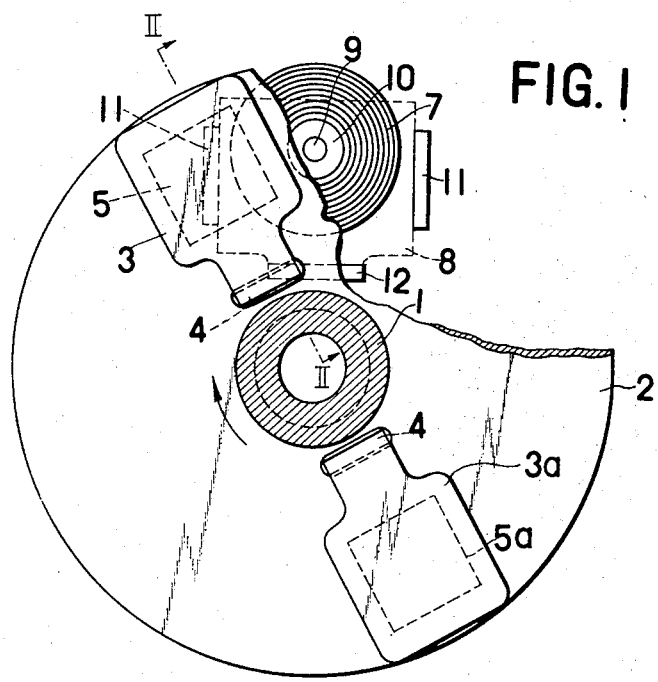
FIG. 1 is an elevation view, partly in section, of a device according to the present invention with parts broken away in order to illustrate important details.

Referring to FIGS. 1 to 4, illustrating a device according to the invention, a rotary shaft 1 is coupled to a rotary body, not shown. In case the device is applied to detecting the rotational angle of a print drum, not shown, of a printer for a calculating machine, the shaft 1 is geared such that it rotates, for instance, through 180° while the print drum rotates an angle corresponding to a peripheral distance between two adjacent types provided thereon. A rotary disk is secured to the end of the shaft 1 and rotates with the shaft. The rotary disk 2 is made of a non-magnetic material such as brass. An L-shaped yoke 3 is secured to the rotary disk 2 such that a projection portion 4 extends through an opening in the disk 2. Another L-shaped yoke 3a is similarly provided on the rotary disk 2 in a symmetrical position relative to the position of the other yoke 3 with respect to the shaft 1. These yokes 3 and 3a are provided with respective permanent magnets 5 and 5a projecting through the rotary disk 2. The rotary shaft 1, the rotary disk 2, the yokes 3 and 3a and the permanent magnets 5 and 5a rotate together and constitute a rotor.

A stationary printed circuit board 6 supports a coil 7 and a yoke 8 to form a stator. The coil 7 is positioned such that the permanent magnets 5 and 5a can move past it as the rotor rotates and it is wound on a bobbin 10 mounted on a core 9 integral with the yoke 8. The yoke 8 has, at its opposite ends, two projections 11 which extend through the circuit boards and flat end faces thereof face the permanent magnets. The yoke 8 has two other projections 12 which have flat end surfaces that confront or face flat end surfaces of the projections 4 and 4a of the rotor side yokes 3 and 3a as the rotor rotates.

Figure 2:
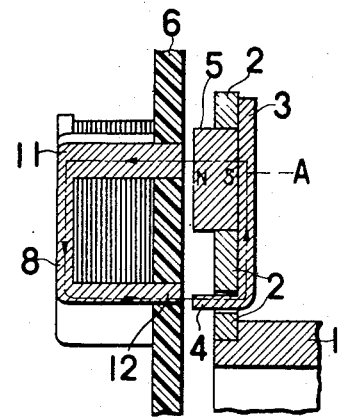
FIG. 2 is a section view taken along section line II—II in FIG. 1.

In operation, the rotary shaft 1 and rotary disk 2 are rotated clockwise in an interlocked relation or synchronised to the rotation of a rotary body, such as a print drum, whose angle of rotation is being detected. As the rotor side yoke 3 and permanent magnet 5 arrive at a position near the coil 7, as shown in FIG. 1, a closed magnetic path A is formed by the magnet 5, the projection 11 of the yoke 8, the yoke 8, the other projection 12 of the yoke 8, the projection 4 of the rotor side yoke and the yoke 3 as shown in FIG. 2. At this time, the coil 7 does not cut the magnetic flux of the magnet 5.

Figure 3:
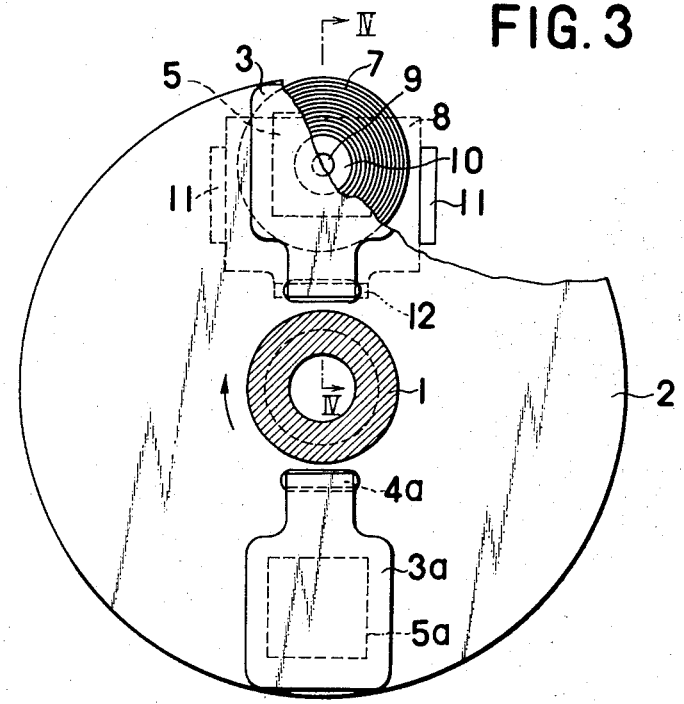
FIG. 3 is a view similar to FIG. 1 showing another operative position of the device of FIG. 1.
Figure 4:
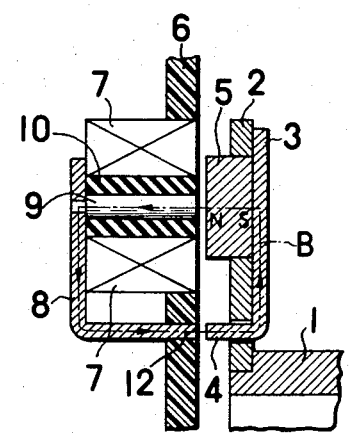
FIG. 4 is a section view taken along section line IV—IV in FIG. 3.

Subsequently, when the permanent magnet 5 is moved to a position of registry with the coil 7, as shown in FIG. 3, the magnetic path of FIG. 2 is switched to a magnetic path B which is formed by the magnet 5, the coil core 9, the yoke 8, the projection 12 of the yoke 8, the projection 4 of the rotor side yoke 3 and the yoke 3 as shown in FIG. 4. At the time of transition from the closed magnetic path A shown in FIG. 2 to the closed magnetic path B shown in FIG. 4, the magnetic flux cuts the coil 7 instantaneously thereby inducing a great voltage across it.

Figure 5:
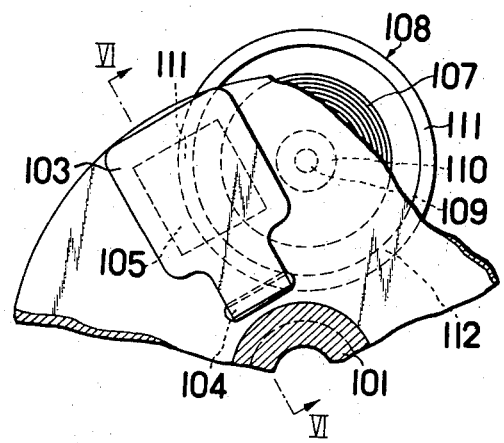
FIG. 5 is a fragmentary elevation view, partly in section, of another device according to this invention with parts broken away in order to illustrate important details.
Figure 6:
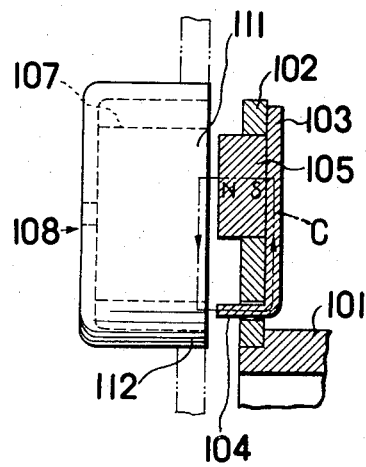
FIG. 6 is a section view taken along section line VI—VI in FIG. 5.

FIGS. 5 and 6 illustrate another embodiment of the invention. In this embodiment, a pot-shaped yoke 108 is used on a stator. Two parts 111 of a side of the yoke 108 can confront a movable magnet 105, and another part or side 112 of the yoke confronts a projection 104 of a movable yoke 103. In operation, upon the rotation of a rotary shaft 101 and a rotary disk 102 the rotor yoke 103 is moved to a position, at which the projection 104 partly faces or confronts the corresponding part of the flange 111, as shown in FIG. 5. At that moment, a closed magnetic path C is formed by the magnet 105, the sides 111 of the stator yoke 108, the projection 104 of the rotor yoke 103 and the rotor yoke 103, as shown in FIG. 6. With the subsequent movement of the magnet 105 to a position of registry as described with respect to the first embodiment the flux linking with the coil 107 changes greatly, thus generating a great induced voltage across the coil 7.

A comparison of measurements of the induced voltage conducted on an example of a conventional device and those of the invention is given in the table below.

The embodiment of FIG. 1 is designated as Example X, and the embodiment of FIG. 5 is designated as Example Y in the following table. Example Z is a conventional device, whose stator L-shaped yoke has no equivalent to the projections 11 in the embodiment of FIG. 1. All these examples use 550-gauss ferrite magnets, and in each instance the rotor speed was 40 revolutions per second. In other words, in all these examples every rotor is in the same condition. On the other hand, every configuration the coil diameter and the number of coil turns are different for the respective examples, as is listed below.

| Example | Coil diameter | Number of Coil Turns | Induced Voltage |
|---|---|---|---|
| X | 0.06 mm | 2,000 | 3.3 volts |
| Y | 0.05 mm | 4,000 | 8 volts |
| Z | 0.03 mm | 3,250 | 1.5 volts |

It will be apparent from the above table that the induced voltages in the Examples X and Y according to the invention are far higher that that in the conventional Example Z in proportion to the number of coil turns.

What we claim and desire to secure by letters patent are:

1. A device for detecting the angular angle of rotation of a rotary body comprising, a stator comprising a first yoke defining a magnetic path for magnetic lines of flux and a coil in said first yoke for having a voltage induced therein by lines of magnetic flux cut by said coil, a rotor rotatably driven in timed relationship with a rotating body the angle of rotation of which is to be detected and comprising a second yoke defining a magnetic path and having a surface movable angularly to a position during rotation of said rotor into registry with a surface of said first yoke and spaced therefrom defining a closed magnetic path between the first yoke and the second yoke when the surfaces are in registry, a permanent magnet on said yoke, said first yoke providing a magnetic path between said magnet and said magnet when said magnet is moved to an angular position in registry with said coil, whereby when the first mentioned surfaces of said first yoke and said second yoke are in registry and said first mentioned surfaces begin to be moved relatively out of registry a maximum induced voltage is developed in said coil, said voltage is indicative of the angular position of said rotor thereby indicative of the angular position of said rotary body, said first yoke comprising three spaced projections extending in a common direction toward said second yoke when said second yoke is in registry therewith, each of said projections having a flat end surface, one of said surfaces constituting said surface of said first yoke defining said closed magnetic path with said second yoke, and said second yoke having a lateral projection having a flat end surface positioned constituting said surface of said first yoke defining said closed magnetic path between said first yoke and said second yoke.

2. A device for detecting the angle of rotation of a rotary body comprising, a rotor rotatably driven in timed relationship with a rotating body the angle of rotation of which is to be detected, a yoke on said rotor, having a lateral projection, a permanent magnet on said yoke applying magnetic flux to said yoke passing through said projection, a stator having a stationary yoke thereon, a coil on said stationary yoke for having a voltage induced therein by magnetic flux cut by said coil, said stationary yoke having a first projecting portion coacting with said yoke to form a closed magnetic path for inducing a voltage on said rotor in said coil during rotation of said rotor and prior to the permanent magnet magnet and the coil being in registry.

3. A device for detecting the angle of rotation of a rotary body according to claim 2, in which said stationary yoke is pot-shaped and said coil is disposed therein.

4. A device for detecting the angle of rotation of a rotary body according to claim 2, in which said yoke on said rotor is L-shaped.

5. A device for detecting the angle of rotation of a rotary body according to claim 4, in which said stationary yoke comprises a second projecting portion and a third projecting portion projecting laterally in a direction common to a direction of projection of said first projecting portion, and another portion on said stationary yoke being disposed in registry with said permanent magnet when said coil and permanent magnet are in registry.

6. A device for detecting the angle of rotation of a rotary body according to claim 5, in which said second projecting protion is disposed in registry with said lateral projection of said yoke on said rotor, and said L-shaped yoke having another portion on which said permanent magnet is disposed and in registry with said another portion of said stationary yoke when said coil and permanent magnet are in registry, and said L-shaped yoke, said second projecting portions, said another portions of both yokes and said permanent magnet defining a second magnetic flux path when said coil and said permanent magnet are in registry.

* * * * *